(12) United States Patent
Ogata

(10) Patent No.: US 12,449,658 B2
(45) Date of Patent: Oct. 21, 2025

(54) IMAGE DISPLAY DEVICE

(71) Applicant: KOITO MANUFACTURING CO., LTD., Tokyo (JP)

(72) Inventor: Yoichi Ogata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 515 days.

(21) Appl. No.: 17/912,922

(22) PCT Filed: Mar. 19, 2021

(86) PCT No.: PCT/JP2021/011537
§ 371 (c)(1),
(2) Date: Sep. 20, 2022

(87) PCT Pub. No.: WO2021/193475
PCT Pub. Date: Sep. 30, 2021

(65) Prior Publication Data
US 2023/0213763 A1    Jul. 6, 2023

(30) Foreign Application Priority Data
Mar. 27, 2020  (JP) ................. 2020-059211

(51) Int. Cl.
*G02B 27/01*      (2006.01)
*B60K 35/22*      (2024.01)
(Continued)

(52) U.S. Cl.
CPC .......... *G02B 27/0172* (2013.01); *B60K 35/22* (2024.01); *B60K 35/23* (2024.01);
(Continued)

(58) Field of Classification Search
CPC ..... G02B 27/00–648; G02B 2027/0105–0198; B60K 35/00–90; B60K 2360/00–96
See application file for complete search history.

(56) References Cited

U.S. PATENT DOCUMENTS

| 10,012,841 B1 | 7/2018 | Frayne et al. |
| 2002/0141068 A1 | 10/2002 | Brennesholtz |

(Continued)

FOREIGN PATENT DOCUMENTS

| CN | 101019438 A | 8/2007 |
| CN | 104169780 A | 11/2014 |

(Continued)

OTHER PUBLICATIONS

International Search Report (PCT/ISA/210) dated Jun. 15, 2021, issued by the International Searching Authority in counterpart International Application No. PCT/JP2021/011537.

(Continued)

*Primary Examiner* — Christopher A Lamb, II
(74) *Attorney, Agent, or Firm* — Sughrue Mion, PLLC

(57) ABSTRACT

An image display device includes: a first image projection unit configured to project a first image; a beam splitter configured to reflect a part of light emitted from the first image projection unit in a first direction and transmit remaining light in a second direction; a retroreflection unit configured to retroreflect, to the beam splitter, light traveling from the beam splitter in one of the first direction and the second direction; a reflection unit configured to reflect, to the beam splitter, light traveling from the beam splitter in the other of the first direction and the second direction; and an image forming optical unit configured to form an image of the light reflected by the retroreflection unit and the reflection unit in a space.

6 Claims, 11 Drawing Sheets

(51) Int. Cl.
  *B60K 35/23* (2024.01)
  *B60K 35/60* (2024.01)
  *G02B 27/14* (2006.01)

(52) U.S. Cl.
  CPC ...... *B60K 35/60* (2024.01); *G02B 2027/0178* (2013.01); *G02B 27/141* (2013.01)

(56) References Cited

U.S. PATENT DOCUMENTS

| | | |
|---|---|---|
| 2006/0033732 A1 | 2/2006 | Fukushima et al. |
| 2008/0285141 A1 | 11/2008 | Sottilare et al. |
| 2013/0265646 A1 | 10/2013 | Sakai |
| 2014/0368922 A1 | 12/2014 | Tohda et al. |
| 2014/0368923 A1* | 12/2014 | Segawa .................. G02B 5/02 |
| | | 359/633 |
| 2017/0010465 A1 | 1/2017 | Martinez et al. |
| 2017/0045738 A1 | 2/2017 | Kim et al. |
| 2017/0235136 A1 | 8/2017 | Kim et al. |
| 2017/0336628 A1 | 11/2017 | Kim et al. |
| 2018/0024373 A1 | 1/2018 | Joseph et al. |
| 2018/0259810 A1 | 9/2018 | Numata et al. |
| 2018/0348532 A1 | 12/2018 | Fukase et al. |
| 2019/0324271 A1* | 10/2019 | Lee .................. G02B 27/286 |
| 2019/0369409 A1 | 12/2019 | Yamada et al. |

FOREIGN PATENT DOCUMENTS

| | | |
|---|---|---|
| CN | 107422477 A | 12/2017 |
| JP | 7-250292 A | 9/1995 |
| JP | 2006-30507 A | 2/2006 |
| JP | 2018-31925 A | 3/2018 |
| JP | 2018-118669 A | 8/2018 |
| JP | 2018-151465 A | 9/2018 |
| JP | 2018-528446 A | 9/2018 |
| JP | 2018-205452 A | 12/2018 |
| WO | 2018/151220 A1 | 8/2018 |

OTHER PUBLICATIONS

Written Opinion (PCT/ISA/237) dated Jun. 15, 2021, issued by the International Searching Authority in counterpart International Application No. PCT/JP2021/011537.

Communication issued on Jan. 24, 2025 from the China National Intellectual Property Administration for Chinese Patent Application No. 202180024864.5.

* cited by examiner

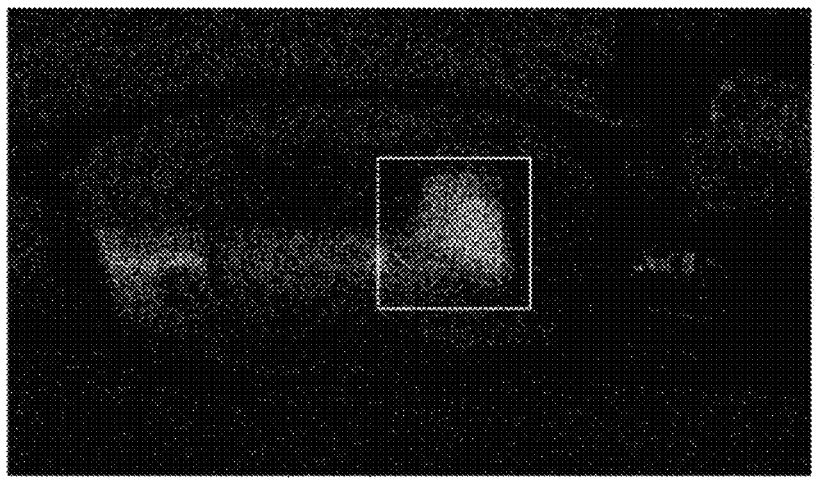
FIG.2A
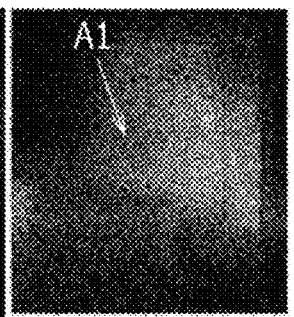
FIG.2B
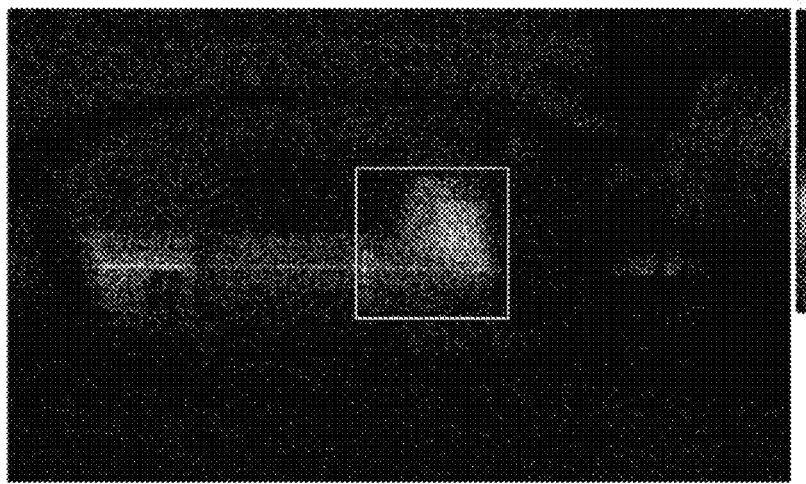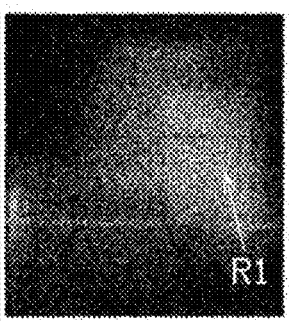
FIG.2C FIG.2D

IMAGE DISPLAY DEVICE

CROSS-REFERENCE TO RELATED APPLICATIONS

This application is a National Phase Entry of PCT International Application No. PCT/JP2021/011537, filed on Mar. 19, 2021, which claims priority to Japanese Patent Application No. 2020-059211 filed on Mar. 27, 2020, the contents of all of which are incorporated herein by reference in their entirety.

TECHNICAL FIELD

The present disclosure relates to an image display device.

BACKGROUND ART

In the related art, an instrument panel for lighting and displaying an icon is used as a device for displaying various kinds of information in a vehicle. Further, as an amount of information to be displayed increases, it has been proposed that an image display device is embedded in the instrument panel or the entire instrument panel is implemented with the image display device.

However, since the instrument panel is located below a windshield of the vehicle, it is not preferable for a driver to visually recognize information displayed on the instrument panel because it is necessary for the driver to move a line of sight downward during driving. Therefore, there has been proposed a head-up display (hereinafter, referred to as HUD) that projects an image onto a windshield so that information can be read when a driver visually recognizes a front of a vehicle (see, for example, Patent Literature 1). In such an HUD, an optical device for projecting an image over a wide range of the windshield is required, and reduction in size and weight of the optical device is desired.

On the other hand, as an image display device that projects light using a small optical device, a head mounted HUD having an eyeglass shape is known (see, for example, Patent Literature 2). The head mounted HUD directly irradiates eyes of a user with light emitted from a light source to project an image on the retina of the user.

CITATION LIST

Patent Literature

Patent Literature 1: JP-A-2018-118669
Patent Literature 2: JP-T-2018-528446

SUMMARY OF INVENTION

Technical Problem

However, in the head mounted HUD of the related art, a background and the image can be displayed in a superimposed manner, but an image forming position of the image formed in the air (aerial image) is fixed within a field of view of the user, and a degree of freedom of a display position is low. In particular, since the image display has a fixed depth position in a line-of-sight direction, it is necessary to expand a display area in order to display a plurality of images, and there is a problem that a ratio of the image occupying the field of view is increased and the background is difficult to visually recognize. Further, since a plurality of images are displayed in parallel, it is difficult to separate and identify each image intuitively and individually.

An object of the present disclosure is to provide an image display device capable of improving a degree of freedom in a depth direction of an image to be formed in a space.

Solution to Problem

In order to solve the above problems, an image display device according to the present disclosure includes; a first image projection unit configured to project a first image; a beam splitter configured to reflect a part of light emitted from the first image projection unit in a first direction and transmit remaining light in a second direction; a retroreflection unit configured to retroreflect, to the beam splitter, light traveling from the beam splitter in one of the first direction and the second direction; a reflection unit configured to reflect, to the beam splitter, light traveling from the beam splitter in the other of the first direction and the second direction; and an image forming optical unit configured to form an image of the light reflected by the retroreflection unit and the reflection unit in a space.

According to the image display device of the present disclosure, since the light split by the beam splitter is reflected by the retroreflection unit and the reflection unit and formed into an image in the space by the image forming optical unit, image forming positions of the light reflected by the retroreflection unit and the light reflected by the reflection unit can be made different from each other, and a degree of freedom in a depth direction of the image to be formed in the space can be improved.

Advantageous Effects of Invention

According to the present disclosure, the image display device capable of improving the degree of freedom in the depth direction of the image to be formed in the space can be provided.

BRIEF DESCRIPTION OF DRAWINGS

FIGS. 2A to 2D illustrate photographs of a display example using the image display device.

DESCRIPTION OF EMBODIMENTS

First Embodiment

Figure 1:
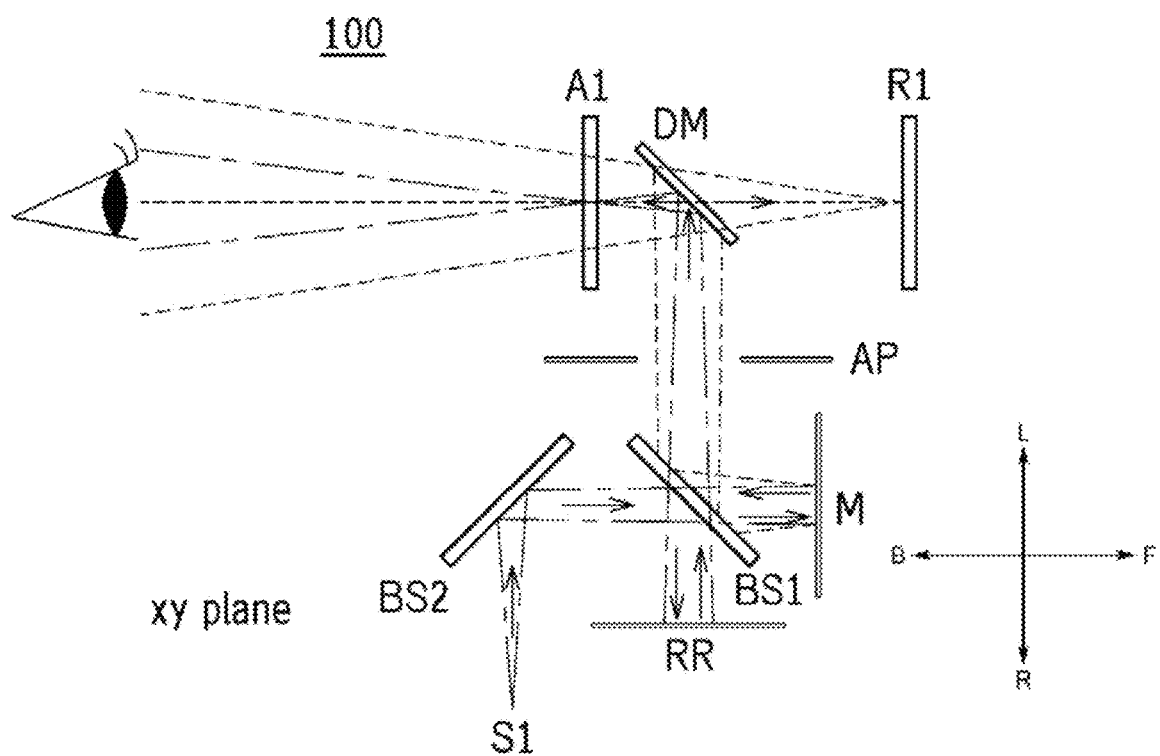
FIG. 1 is an optical path diagram of an image display device according to a first embodiment.

Hereinafter, embodiments of the present disclosure will be described in detail with reference to the drawings. The same or equivalent components, members, and processes illustrated in the drawings are denoted by the same reference numerals, and a repeated description thereof will be omitted as appropriate. Further, dimensions of members illustrated in the drawings may be different from actual dimensions of the members for convenience of description. FIG. 1 is an optical path diagram of an image display device 100 according to the present embodiment. As illustrated in FIG. 1, the image display device 100 includes a first image projection unit S1, a first beam splitter BS1 (an example of a beam splitter), a second beam splitter BS2, a retroreflection unit RR, a reflection unit M, and a dichroic mirror DM. In the drawing, lines indicated by broken lines and one-dot chain lines schematically indicate paths of light emitted from the first image projection unit S1.

In the image display device 100 illustrated in FIG. 1, a user visually recognizes a first front image A1 and a first rear image R1 projected from the first image projection unit S1 at different distances from a viewpoint in a depth direction. In FIG. 1, a direction in which the first front image A1 and the first rear image R1 are aligned is defined as the depth direction. An up-down direction of a paper surface orthogonal to the depth direction is defined as a lateral direction. Further, a direction orthogonal to the depth direction and the lateral direction is defined as a vertical direction. The "depth direction" is a direction including a "front direction" and a "back direction". The "lateral direction" is a direction including a "left direction" and a "right direction". The "vertical direction" is a direction including an "up direction" and a "down direction". In the drawings to be described below, a reference numeral U denotes the up direction. A reference numeral D denotes the down direction. A reference numeral F denotes the front direction. A reference numeral B denotes the back direction. A reference numeral L denotes the left direction. A reference numeral R denotes the right direction. Here, in FIG. 1, the left-right direction is expressed in the depth direction which is a line-of-sight direction from the viewpoint, but the lateral direction and the vertical direction are for expressing a positional relationship in FIG. 1, and the up, down, left and right may be changed.

The first image projection unit S1 is a device that emits light for forming an image, and projects the image at a predetermined distance from eyes (viewpoint) of the user. The first image projection unit S1 is disposed on a right side of a second beam splitter BS2 to be described later, and irradiates one surface (a surface facing the first beam splitter BS1) of the second beam splitter BS2 with light in the lateral direction.

The configuration of the first image projection unit S1 is not limited, and a liquid crystal display device including a backlight, a self-luminous organic EL display device, a projector device using a light source and a modulation element, or the like may be used. The image projected by the first image projection unit S1 may be a still image or a moving image. Further, the first image projection unit S1 may include an optical member such as a lens.

The first beam splitter BS1 is a member that transmits a part of an incident light and reflects a part of the incident light. A partial reflection plate on which a film for adjusting a reflectance is formed may be used on a surface of the first beam splitter BS1. The first beam splitter BS1 is disposed at an angle of 45 degrees with respect to the lateral direction and the depth direction. The first beam splitter BS1 is also disposed so as to be inclined at 45 degrees with respect to an optical axis of the light emitted from the first image projection unit S1.

A partial reflection plate on which a film for adjusting a reflectance is formed may be used on a surface of the beam splitter BS2 that is a member transmitting a part of the incident light and reflecting a part of the incident light. The second beam splitter BS2 is disposed so as to be inclined at an angle of 45 degrees with respect to the lateral direction and the depth direction. The second beam splitter BS2 is also disposed so as to be inclined at 45 degrees with respect to the optical axis of the light emitted from the first image projection unit S1. Further, the first beam splitter BS1 and the second beam splitter BS2 are disposed to face each other so as to intersect each other at an angle of 90 degrees.

Here, the light transmittance and reflectance of the first beam splitter BS1 and the second beam splitter BS2 can be selected in any balance. For example, both the first beam splitter BS1 and the second beam splitter BS2 have a transmittance of 50% and a reflectance of 50%. Further, in the present embodiment, the first beam splitter BS1 and the second beam splitter BS2 are disposed so as to be inclined at 45 degrees with respect to the optical axis of the light emitted from the first image projection unit S1, and the first beam splitter BS1 and the second beam splitter BS2 are disposed to be orthogonal to each other. However, the arrangement of the first beam splitter BS1 and the second beam splitter BS2 is not limited to the present embodiment, and the first beam splitter BS1 and the second beam splitter BS2 can be disposed at an appropriate angle based on a relationship between a direction of the light emitted from the first image projection unit S1 and an image forming position of the image.

The first beam splitter BS1 and the second beam splitter BS2 of the present embodiment are plate-shaped beam splitters, but may be cube-shaped beam splitters configured by joining inclined surfaces of two right angle prisms so as to sandwich a film for adjusting a reflectance.

The retroreflection unit RR is an optical member that reflects the incident light in an incident direction. For the retroreflection unit RR, a retroreflection unit having a structure in which fine glass beads are spread on a surface side of a reflective film or a structure using a prism may be used. The retroreflection unit RR is disposed on a right side of the first beam splitter BS1. A retroreflective surface of the retroreflection unit RR is orthogonal to the lateral direction.

The reflection unit M is an optical member that specularly reflects the incident light in the incident direction. For example, a mirror having a structure in which a surface of a plate-shaped member is subjected to mirror finishing may be used as the reflection unit M. The reflection unit M is disposed in the depth direction of the second beam splitter BS2, and a reflective surface of the reflection unit M is orthogonal to the depth direction. In FIG. 1, a flat plate shaped unit is illustrated as the reflection unit M, but a concave mirror or a convex mirror may be used.

The dichroic mirror DM is an optical member that reflects light of a specific wavelength and transmits light of other wavelengths. The dichroic mirror DM is disposed on a left side of the retroreflection unit RR and the first beam splitter BS1, and is disposed so as to be inclined at an angle of 45 degrees in the depth direction. In the example illustrated in FIG. 1, the dichroic mirror DM reflects a wavelength of the light emitted from the first image projection unit S1 and transmits other visible light. As will be described later, since the first front image A1 that is a real image and the first rear image R1 that is a virtual image, are formed in a space by the light reflected by the dichroic mirror DM, the dichroic mirror DM constitutes an image forming optical unit in the present disclosure.

Although omitted in FIG. 1, an image forming lens may be disposed as a part of an image forming optical system between the first beam splitter BS1 and the dichroic mirror DM. The image forming lens is an optical member for forming an image of light traveling from the first beam splitter BS1 at a predetermined position in the space. A plurality of lens groups may be used as the image forming lens.

As illustrated in FIG. 1, the light emitted from the first image projection unit S1 is reflected by the second beam splitter BS2 and then reaches the first beam splitter BS1. A part of the light that has reached the first beam splitter BS1 is reflected, travels in a direction of the retroreflection unit RR, is re-reflected by the retroreflection unit RR, and is re-incident on the first beam splitter BS1. Here, as illustrated in FIG. 1, the light whose optical path has been expanded and traveled until reaching the retroreflection unit RR is incident on the first beam splitter BS1 as light whose optical path is reduced by a retroreflection characteristic of the retroreflection unit RR. The light re-incident on the first beam splitter BS1 passes through the first beam splitter BS1, is reflected by the dichroic mirror DM, and is focused at a first distance between the dichroic mirror DM and the viewpoint to form the first front image A1.

The remaining part of the light that has reached the first beam splitter BS1 passes and travels in a direction of the reflection unit M, is re-reflected by the reflection unit M, and is re-incident on the first beam splitter BS1. The light re-incident on the first beam splitter BS1 is reflected by the first beam splitter BS1, is further reflected by the dichroic mirror DM, and travels in a viewpoint direction. At this time, since the light reflected by the reflection unit M, the first beam splitter BS1, and the dichroic mirror DM travels with the optical path enlarged, the light is visually recognized by the user as the light travels and is focused at a second distance behind the dichroic mirror DM. Therefore, it can be considered that the first rear image R1 is formed behind the dichroic mirror DM.

As described above, the dichroic mirror DM forms the first front image A1 and the first rear image R1 by reflecting the light reflected by at least one of the retroreflection unit RR and the reflection unit M. The light formed as the first front image A1 and the first rear image R1 reaches the eyes of the user. Therefore, the user visually recognizes the first front image A1 and the first rear image R1 in the air in the depth direction. Further, even in a case where a transmission plate that transmits light from the background is disposed in the line-of-sight direction from the viewpoint of the user, the user can visually recognize the first front image A1 formed in front of the dichroic mirror DM and the first rear image R1 formed behind the dichroic mirror DM while visually recognizing the background through the transmission plate.

Specific examples of the transmission plate include a display surface of another head-up display, a windshield of a vehicle, a shield of a helmet, and the like. Further, an image may be displayed on these transmission plates by using another display device.

FIG. 1 illustrates an example in which the second beam splitter BS2, the first beam splitter BS1, and the reflection unit M are arranged in the depth direction, and even when the reflection unit M and the retroreflection unit RR are disposed in a interchanged manner, the first front image A1 and the first rear image R1 are formed at the same positions as those illustrated in FIG. 1. Although FIG. 1 illustrates a configuration in which the light from the first image projection unit S1 is reflected by the second beam splitter BS2 and reaches the first beam splitter BS1, a configuration in which the first image projection unit S1 is disposed in the depth direction of the second beam splitter BS2 and the light passing through the second beam splitter BS2 reaches the first beam splitter BS1 may be adopted. Alternatively, light may be directly incident on the first beam splitter BS1 without using the second beam splitter BS2.

EMBODIMENTS

FIGS. 2A to 2D illustrate photographs of a display example using the image display device 100. A photograph of FIG. 2A is a photograph formed by setting a focus point at a shorter distance than the dichroic mirror DM, and a photograph of FIG. 2B is a partially enlarged photograph of the photograph of FIG. 2A. A photograph of FIG. 2C is a photograph formed by setting the focus point at a longer distance than the dichroic mirror DM, and a photograph of FIG. 2D is a partially enlarged photograph of the photograph of FIG. 2C. The image display device 100 is configured as a wearable device to be worn on eyeglasses. As illustrated in the photographs of FIGS. 2A to 2D, the first front image A1 can be clearly visually recognized when the focus point is set at a shorter distance than the dichroic mirror DM, and the first rear image R1 can be clearly visually recognized when the focus point is set at a longer distance than the dichroic mirror DM. The first front image A1 and the first rear image R1 have different image forming positions in the depth direction on the same line of sight. In the image display device 100 in the example of FIGS. 2A to 2D, two superimposed dichroic mirrors, one of which reflects blue light and the other of which reflects green light, are used as the dichroic mirror DM.

Figure 3A:
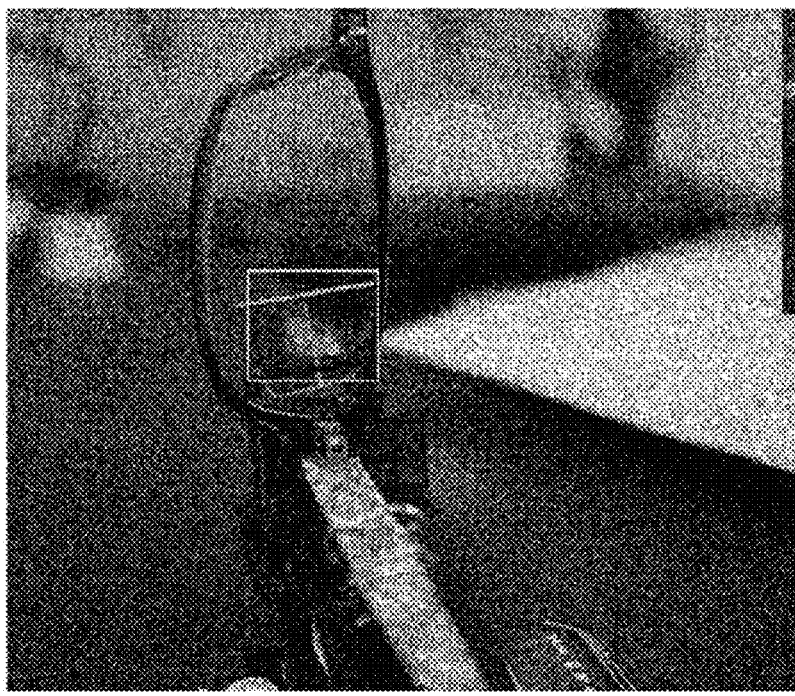
FIGS. 3A to 3D illustrate photographs of another display example using the image display device.
Figure 3B:
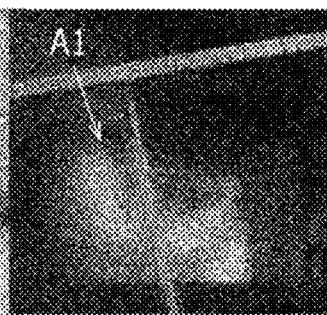
Figure 3C:
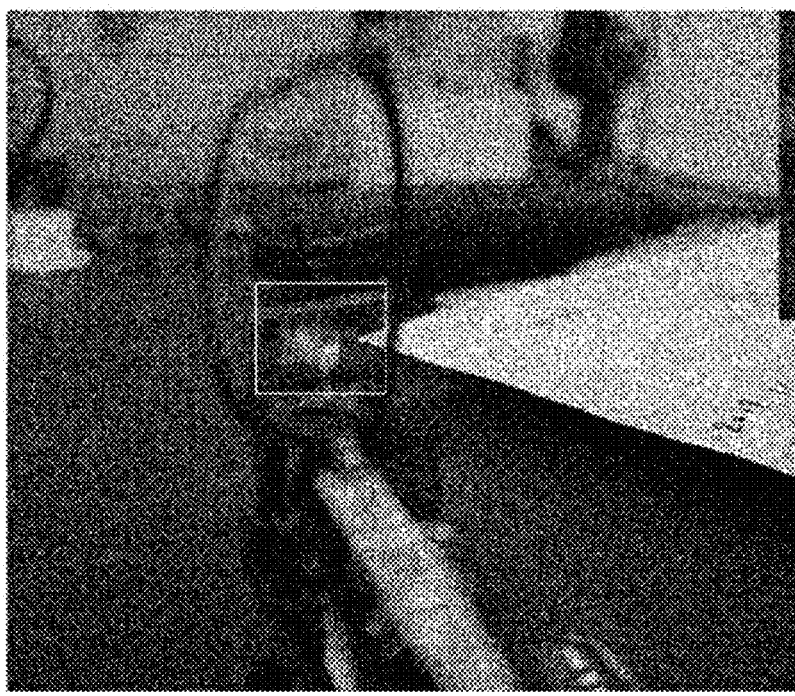
Figure 3D:
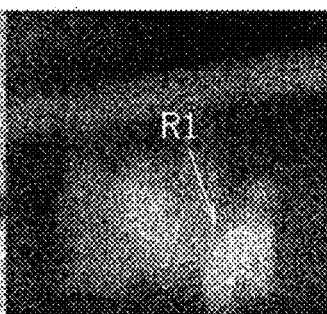

FIGS. 3A to 3D illustrate photographs of another display example using the image display device 100. A photograph of FIG. 3A is a photograph formed by setting the focus point at a shorter distance than the dichroic mirror DM, and a photograph of FIG. 3B is a partially enlarged photograph of the photograph of FIG. 3A. A photograph of FIG. 3C is a photograph formed by setting the focus point at a longer distance than the dichroic mirror DM, and a photograph of FIG. 3D is a partially enlarged photograph of the photograph of FIG. 3C. In the photographs of FIGS. 3A to 3D, the dichroic mirror DM is disposed in front of a frame of glasses, and a memorandum sheet is disposed farther than the dichroic mirror DM. The image display device 100 is configured as a wearable device to be worn on eyeglasses. In the photographs of FIGS. 3A to 3D, the first front image A1 can also be clearly visually recognized when the focus point is set in the vicinity of the frame, and the first rear image R1 can also be clearly visually recognized when the focus point is set in the vicinity of the memorandum sheet. Further, the first front image A1 and the first rear image R1 have different image forming positions in the depth direction on the same line of sight, and the background can also be visually recognized at the same time. In the image display device 100 in the example of FIGS. 3A to 3D, one dichroic mirror that reflects green light is used as the dichroic mirror DM.

Figure 4A:
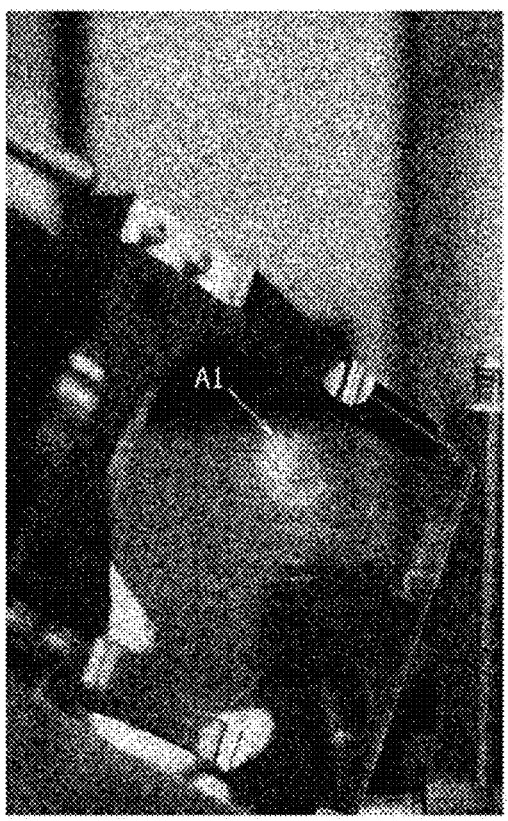
FIGS. 4A and 4B illustrate photographs of still another display example using the image display device.
Figure 4B:
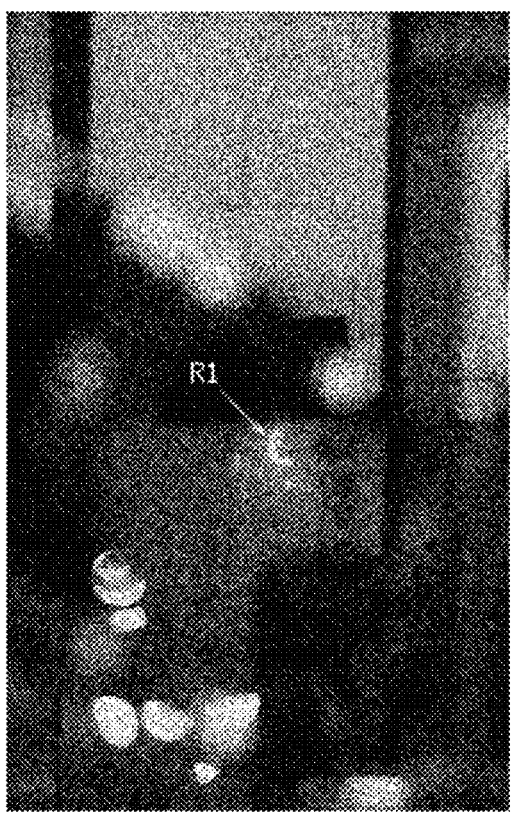

FIGS. 4A and 4B illustrate photographs of still another display example using the image display device 100. A photograph of FIG. 4A is a photograph formed by setting the focus point at a shorter distance than the dichroic mirror DM, and a photograph of FIG. 4B is a photograph formed by setting the focus point at a longer distance than the dichroic mirror DM. The image display device 100 is configured as ahead-up display on a bread board. As illustrated in the photographs of FIGS. 4A and 4B, the first front image A1 can be clearly visually recognized when the focus point is set at a shorter distance than the dichroic mirror DM, and the first rear image R1 can be clearly visually recognized when the focus point is set at a longer distance than the dichroic mirror DM. Further, the first front image A1 and the first rear image R1 have different image forming positions in the depth direction on the same line of sight, and the background can also be visually recognized at the same time even when the background is white. In the image display device 100 in the example of FIGS. 4A and 4B, two superimposed dichroic mirrors, one of which reflects blue light and the other of which reflects green light, are used as the dichroic mirror DM.

As described above, the user can visually recognize the first front image A1 and the first rear image R1 at the first distance and the second distance which are different positions in the depth direction when the light for forming the first front image A1 and the first rear image R1 is incident within a field of view range of the same user. At the same time, the user can visually recognize the background that reaches the eyes through the dichroic mirror DM. Therefore, the user visually recognizes aerial images in which the first front image A1 and the first rear image R1 are superimposed on the background or an image display by another display device.

Second Embodiment

Figure 5:
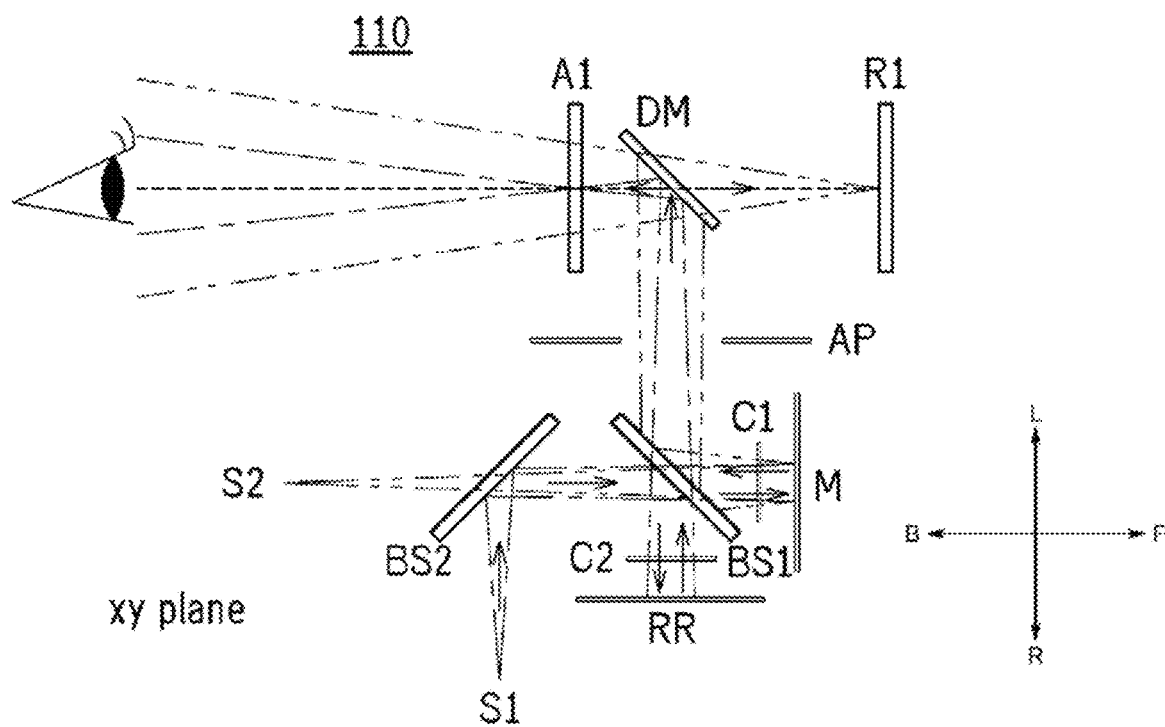
FIG. 5 is an optical path diagram of an image display device according to a second embodiment.

Next, a second embodiment of the present disclosure will be described with reference to FIG. 5. The description of the same contents as those of the first embodiment will be omitted. The present embodiment is different from the first embodiment in that the display contents of the first front image A1 and the first rear image R1, which are aerial images, are different from each other. FIG. 5 is an optical path diagram of an image display device 110 according to the present embodiment. As illustrated in FIG. 5, the image display device 110 includes the first image projection unit S1, a second image projection unit S2, the first beam splitter BS1, the second beam splitter BS2, the retroreflection unit RR, the reflection unit M, a first filter C1, a second filter C2, and the dichroic mirror DM. In the drawing, lines indicated by two-dot chain lines schematically indicate paths of light emitted from the second image projection unit S2.

The second image projection unit S2 is a device that emits the light for forming an image, and projects the image at a predetermined distance from eyes (viewpoint) of a user. The second image projection unit S2 is disposed in a depth direction of the second beam splitter BS2. The first image projection unit S1 irradiates one surface (a surface facing the first beam splitter BS1) of the second beam splitter BS2 with light in a lateral direction, and the second image projection unit S2 irradiates the other surface (a surface opposite the first beam splitter BS1) of the second beam splitter BS2 with the light in the depth direction.

The first image projection unit S1 and the second image projection unit S2 may be implemented by independent devices, or may be configured to project images of different regions in the same device in different directions using an optical member. A wavelength of light emitted by the first image projection unit S1 is different from a wavelength of the light emitted by the second image projection unit S2. The wavelength of the light emitted by the first image projection unit S1 is defined as a first wavelength $\lambda 1$, and the wavelength of the light emitted by the second image projection unit S2 is defined as a second wavelength $\lambda 2$.

The dichroic mirror DM is configured to reflect the light of the first wavelength $\lambda 1$ emitted by the first image projection unit S1 and the light of the second wavelength $\lambda 2$ emitted by the second image projection unit S2. For example, when M1 is blue light and $\lambda 2$ is green light, the dichroic mirror DM is used, in which two dichroic mirrors, one of which reflects blue light and the other of which reflects green light, are superposed.

The first filter C1 and the second filter C2 are optical members that cut light of a specific wavelength and transmit light of other wavelengths. The first filter C1 is designed to cut the light of the first wavelength $\lambda 1$ emitted by the first image projection unit S1, and the second filter C2 is designed to cut the light of the second wavelength $\lambda 2$ emitted by the second image projection unit S2.

As illustrated in FIG. 5, the light emitted from the first image projection unit S1 is reflected by the second beam splitter BS2 and then reaches the first beam splitter BS1. The light emitted from the second image projection unit S2 passes through the second beam splitter BS2 and then reaches the first beam splitter BS1.

A part of the light that has reached the first beam splitter BS1 is reflected, travels in a direction of the retroreflection unit RR through the second filter C2, is re-reflected by the retroreflection unit RR, and is re-incident on the first beam splitter BS1. Here, since the second filter C2 cuts the second wavelength $\lambda 2$, the light of the second wavelength $\lambda 2$ emitted from the second image projection unit S2 is cut, and only the light of the first wavelength $\lambda 1$ emitted from the first image projection unit S1 passes. The light re-incident on the first beam splitter BS1 passes through the first beam splitter BS1, is reflected by the dichroic mirror DM, and is focused at a first distance between the dichroic mirror DM and the viewpoint to form the first front image A1 projected by the first image projection unit S1.

The remaining part of the light that has reached the first beam splitter BS1 passes and travels in a direction of the reflection unit M through the first filter C1, is reflected by the reflection unit M, and is re-incident on the first beam splitter BS1. Here, since the first filter C1 cuts the first wavelength $\lambda 1$, the light of the first wavelength $\lambda 1$ emitted from the first image projection unit S1 is cut, and only the light of the second wavelength $\lambda 2$ emitted from the second image projection unit S2 passes. The light re-incident on the first beam splitter BS1 is reflected by the first beam splitter BS1, is further reflected by the dichroic mirror DM, and travels in a viewpoint direction. At this time, since the light reflected by the reflection unit M, the first beam splitter BS1, and the dichroic mirror DM travels with the optical path enlarged, the light is visually recognized by the user as the light travels and is focused at a second distance behind the dichroic mirror DM. Therefore, it can be considered that the first rear image R1 projected by the second image projection unit S2 is formed behind the dichroic mirror DM.

In the image display device 110 of the present embodiment, the light formed as the first front image A1 and the first rear image R1 also reaches the eyes of the user. Therefore, the user visually recognizes the first front image A1 and the first rear image R1 having different display contents in the air in the depth direction. Further, even in a case where a transmission plate that transmits light from the background is disposed in a line-of-sight direction from the viewpoint of the user, the user can visually recognize the first front image A1 formed in front of the dichroic mirror DM and the first rear image R1 formed behind the dichroic mirror DM while visually recognizing the background through the transmission plate.

Third Embodiment

Figure 6:
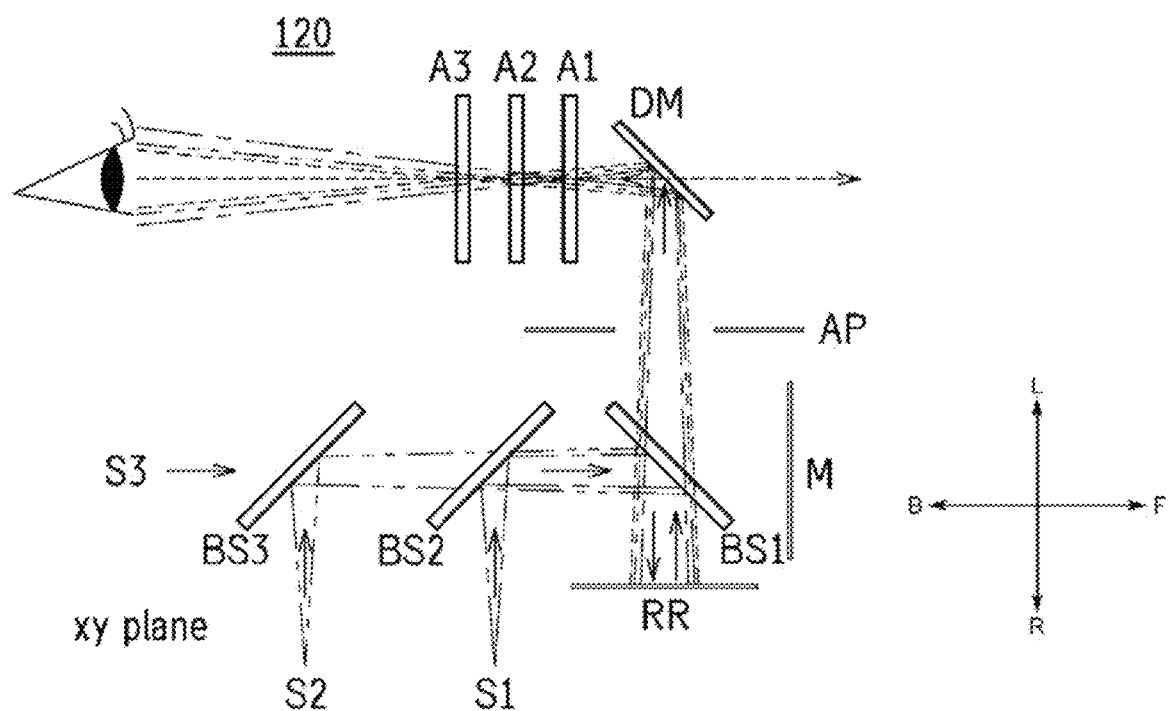
FIG. 6 is an optical path diagram of light passing through a retroreflection unit in an image display device according to a third embodiment.
Figure 7:
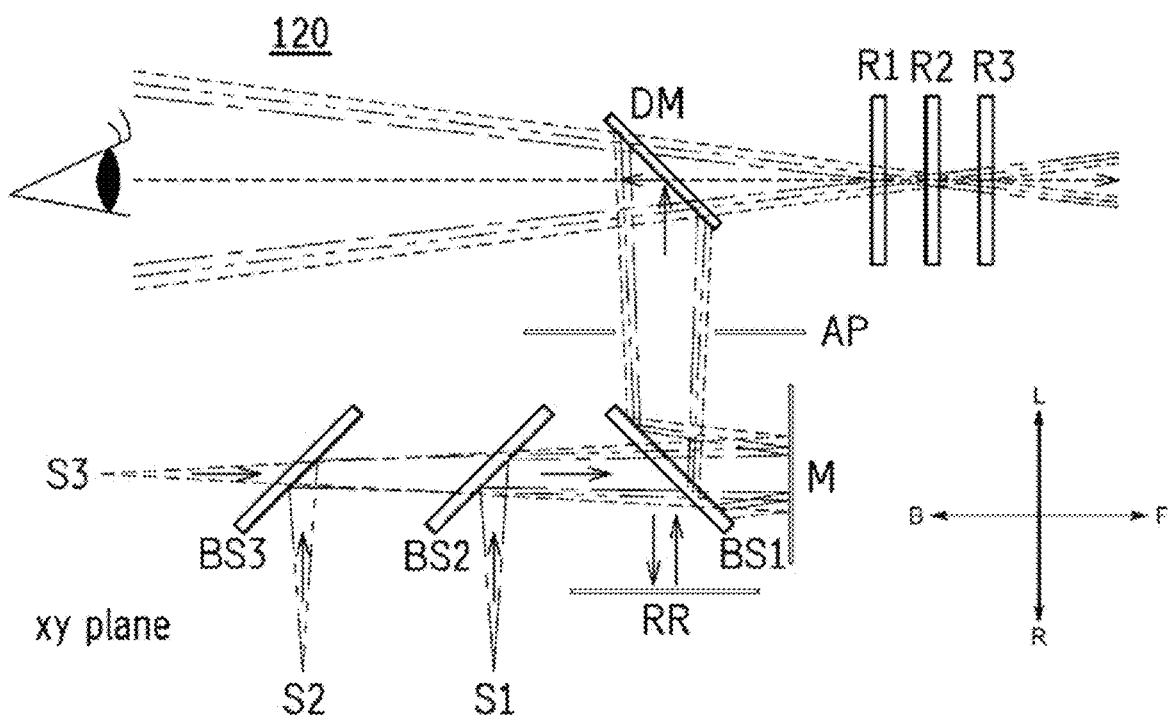
FIG. 7 is an optical path diagram of light passing through a reflection unit in the image display device according to the third embodiment.

Next, a third embodiment of the present disclosure will be described with reference to FIGS. 6 and 7. The description of the same contents as those of the first embodiment will be omitted. The present embodiment is different from the first embodiment in that the number of aerial images formed in the air is increased. FIG. 6 is an optical path diagram of light passing through a retroreflection unit in an image display device 120 according to the present embodiment. FIG. 7 is an optical path diagram of light passing through a reflection unit in the image display device 120 according to the present embodiment. As illustrated in FIGS. 6 and 7, the image display device 120 includes the first image projection unit S1, the second image projection unit S2, a third image projection unit S3, the first beam splitter BS1, the second beam splitter BS2, a third beam splitter BS3, the retroreflection unit RR, the reflection unit M, and the dichroic mirror DM. In FIGS. 6 and 7, lines indicated by broken lines schematically indicate paths of light emitted from the third image projection unit S3.

The third beam splitter BS3 is a member that transmits a part of an incident light and reflects a part of the incident light. A partial reflection plate on which a film for adjusting a reflectance is formed may be used on a surface of the third beam splitter BS3. The third beam splitter BS3 is disposed so as to be inclined at an angle of 45 degrees with respect to the lateral direction and the depth direction. Further, the third beam splitter BS3 and the second beam splitter BS2 are inclined in the same direction, and are disposed to face each other in parallel.

The third image projection unit S3 is a device that emits light for forming an image, and projects the image at a predetermined distance from eyes (viewpoint) of a user. The third image projection unit S3 is arranged in the depth direction side by side with the first to third beam splitters BS1, BS2, and BS3 and the reflection unit M, and irradiates one surface of the third beam splitter BS3 (a surface opposite the second beam splitter BS2) with the light in the depth direction. The second image projection unit S2 is disposed on a right side of the third beam splitter BS3, and irradiates the other surface (a surface facing the second beam splitter BS2) of the third beam splitter BS3 with light in the lateral direction.

The light emitted from the second image projection unit S2 is reflected by the third beam splitter BS3, passes through the second beam splitter BS2, and reaches the first beam splitter BS1. Further, the light emitted from the third image projection unit S3 passes through the third beam splitter BS3 and the second beam splitter BS2, and then reaches the first beam splitter BS1.

As illustrated in FIG. 6, of the light incident on the first beam splitter BS1, the light that has passed through the retroreflection unit RR is incident on the dichroic mirror DM along the same path as in the first embodiment, and forms aerial images as the first front image A1, a second front image A2, and a third front image A3 in the air on a side closer to the user than the dichroic mirror DM. Further, as illustrated in FIG. 7, of the light incident on the first beam splitter BS1, the light that has passed through the reflection unit M is incident on the dichroic mirror DM along the same path as in the first embodiment, and forms aerial images as the first rear image R1, a second rear image R2, and a third rear image R3 in the air on a side farther from the user than the dichroic mirror DM.

In the image display device 120 of the present embodiment, the third beam splitter BS3 and the third image projection unit S3 are added, so that the number of aerial images formed in the air can be added. Although FIGS. 6 and 7 illustrate an example in which three aerial images are formed by using three image projection units, the number of images can be further increased by increasing the number of beam splitters and image projection units.

Fourth Embodiment

Figure 8:
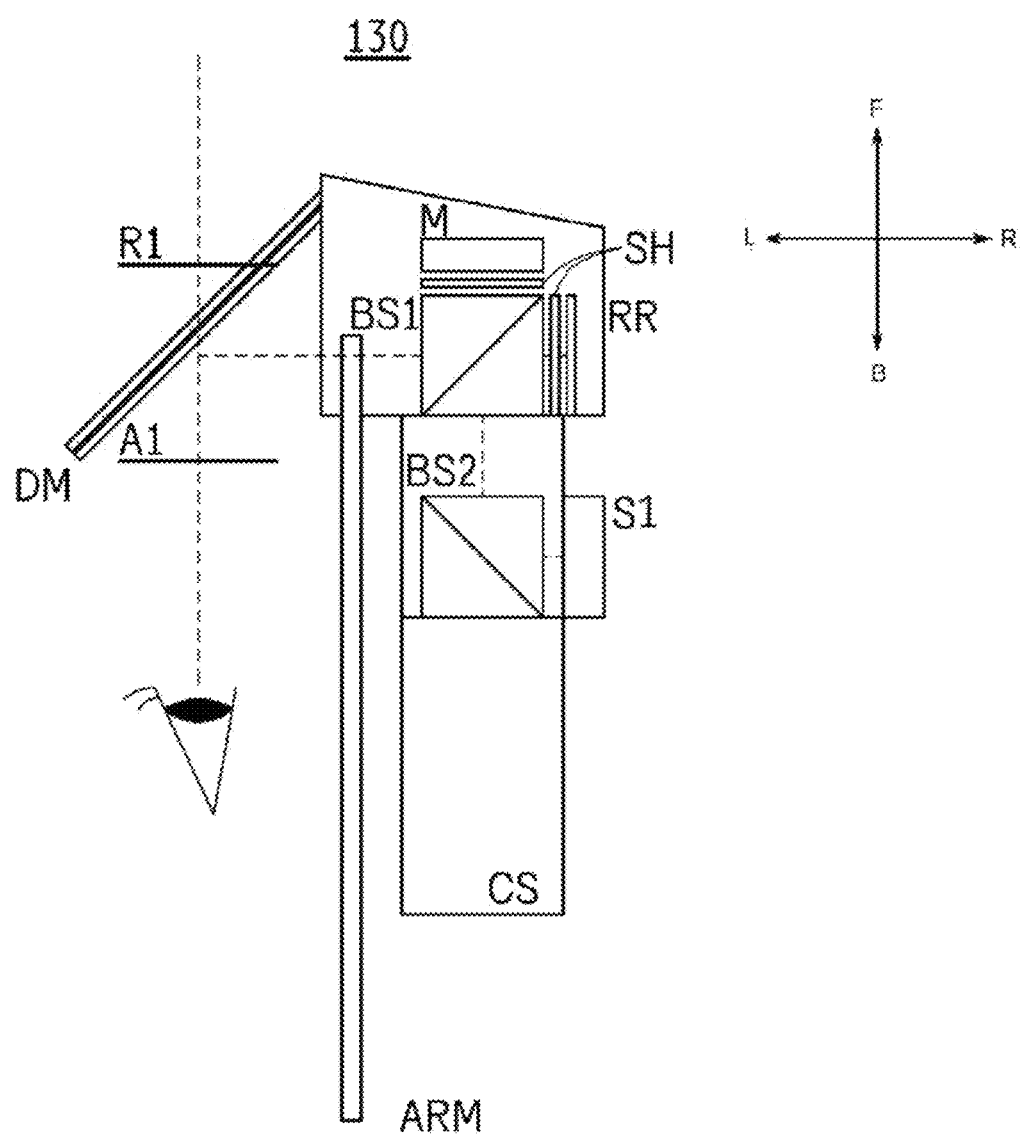
FIG. 8 is an optical path diagram of an image display device according to a fourth embodiment.

Next, a fourth embodiment of the present disclosure will be described with reference to FIG. 8. The description of the same contents as those of the first embodiment will be omitted. The present embodiment is different from the first embodiment in that the first front image A1 and the first rear image R1 projected by the first image projection unit S1 are selectively formed. FIG. 8 is an optical path diagram of an image display device 130 according to the present embodiment. As illustrated in FIGS. 8, the image display device 130 includes the first image projection unit S1, the first beam splitter BS1, the second beam splitter BS2, the retroreflection unit RR, the reflection unit M, the dichroic mirror DM, shutter portions SH, a case portion CS, and a rotation supporting portion ARM.

The shutter portions SH are optical members that are disposed between the first beam splitter BS1 and the retroreflection unit RR and between the first beam splitter BS1 and the reflection unit M and switch between passing and blocking of light. A specific configuration of the shutter portion SH is not limited, and a known one such as an optical isolator, a liquid crystal shutter, or an iris may be used. Switching between opening and closing (passing and blocking) of the shutter portion SH is controlled by a control unit (not illustrated).

The case portion CS is a housing that accommodates and holds each unit. In the example illustrated in FIG. 8, the first beam splitter BS1, the second beam splitter BS2, the retroreflection unit RR, the reflection unit M. and the shutter portions SH are accommodated inside the case portion CS, and the first image projection unit S1 and the dichroic mirror DM are held outside by the case portion CS.

The rotation supporting portion ARM is a member that supports the first beam splitter BS1, the retroreflection unit RR, the reflection unit M, and the dichroic mirror DM while maintaining a relative positional relationship therebetween, and is a member provided so as to be rotatable around a fulcrum point as a rotation center. In the present embodiment, an example in which the first image projection unit S1 is also held by the rotation supporting portion ARM is illustrated.

Since the rotation supporting portion ARM is rotatable while maintaining the relative positional relationship therebetween, the rotation supporting portion ARM needs to be made of a material having a certain degree of rigidity. A specific material or shape of the rotation supporting portion ARM is not limited, and for example, metal, a resin, paper, or the like may be used.

In the present embodiment, the path of the light emitted by the first image projection unit S1 is also similar to that in the first embodiment, the first front image A1 is formed on the side closer to the user than the dichroic mirror DM, and the first rear image R1 is formed on the side farther from the user than the dichroic mirror DM. At this time, since only light in a path in which the shutter portion SH is opened (transmits the light) forms an image, the first front image A1 and the first rear image R1 can be selectively formed by opening and closing the shutter portion SH.

Specifically, when the shutter portion SH provided between the first beam splitter BS1 and the retroreflection unit RR is set to a transmission state and the shutter portion SH provided between the first beam splitter BS1 and the reflection unit M is set to a blocking state, only the first front image A1 is formed. On the other hand, when the shutter portion SH provided between the first beam splitter BS1 and the retroreflection unit RR is set to the blocking state and the shutter portion SH provided between the first beam splitter BS1 and the reflection unit M is set to the transmission state, only the first rear image R1 is formed.

As described above, in the image display device 130 of the present embodiment, since the first front image A1 and the first rear image R1 can be selectively formed by opening and closing operations of the shutter portions SH, the user can switch between presence and absence of a display of the first front image A1 or the first rear image R1. Further, even in a case where a transmission plate that transmits light from the background is disposed in a line-of-sight direction from the viewpoint of the user, the user can visually recognize the first front image A1 formed in front of the dichroic mirror DM and the first rear image R1 formed behind the dichroic mirror DM while visually recognizing the background through the transmission plate.

Fifth Embodiment

Figure 9:
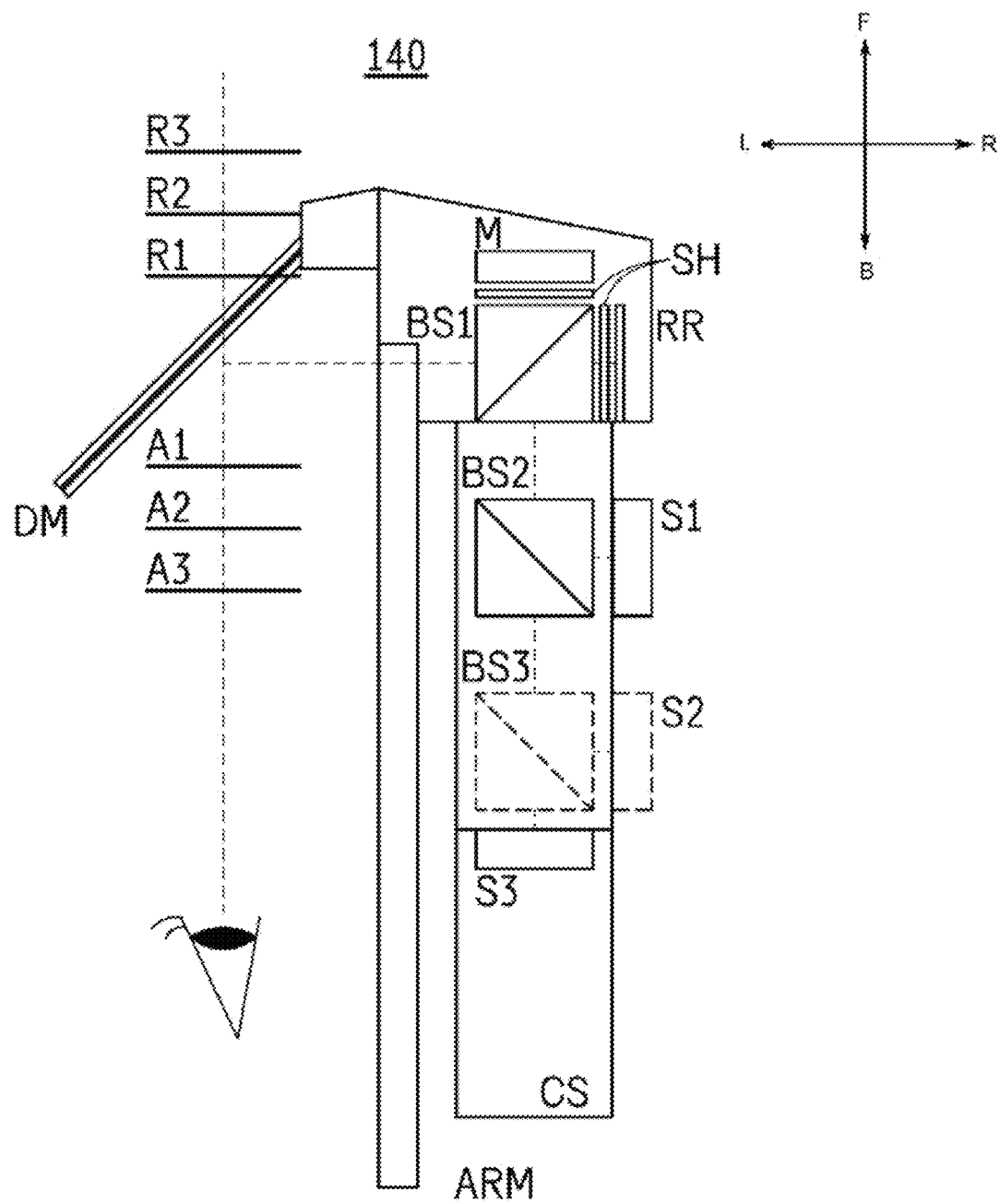
FIG. 9 is an optical path diagram of an image display device according to a fifth embodiment.

Next, a fifth embodiment of the present disclosure will be described with reference to FIG. 9. The description of the same contents as those of the first embodiment and the fourth embodiment will be omitted. The present embodiment is different from the fourth embodiment in that the number of aerial images formed in the air is increased. FIG. 9 is an optical path diagram of an image display device 140 according to the present embodiment. As illustrated in FIG. 9, the image display device 140 includes the first image projection unit S1, the second image projection unit S2, the third image projection unit S3, the first beam splitter BS1, the second beam splitter BS2, the third beam splitter BS3, the retroreflection unit RR, the reflection unit M, the dichroic mirror DM, the shutter portions SH, the case portion CS, and the rotation supporting portion ARM.

In the image display device 140 of the present embodiment, it is also possible to select the first front image A1, the second front image A2, and the third front image A3 formed at a shorter distance than the dichroic mirror DM and the first rear image R1, the second rear image R2, and the third rear image R3 formed at a longer distance than the dichroic mirror DM by opening and closing operations of the shutter portions SH.

Sixth Embodiment

Figure 10:
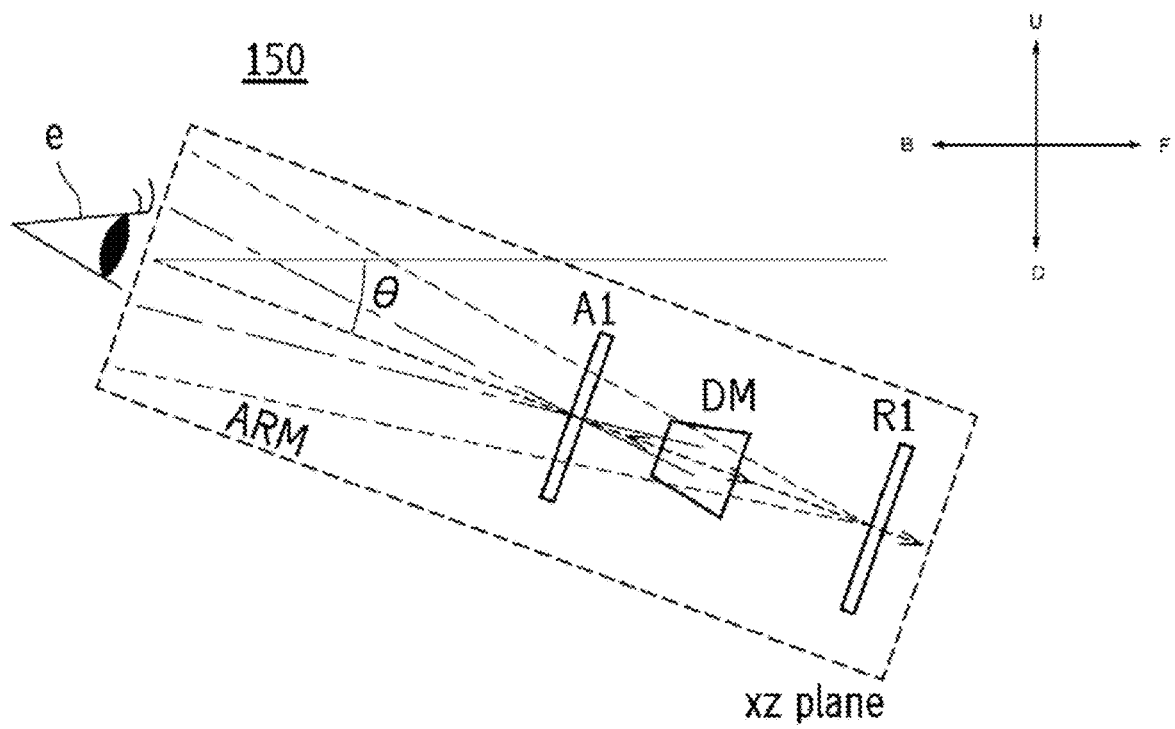
FIG. 10 is an optical path diagram of an image display device according to a sixth embodiment.
Figure 11:
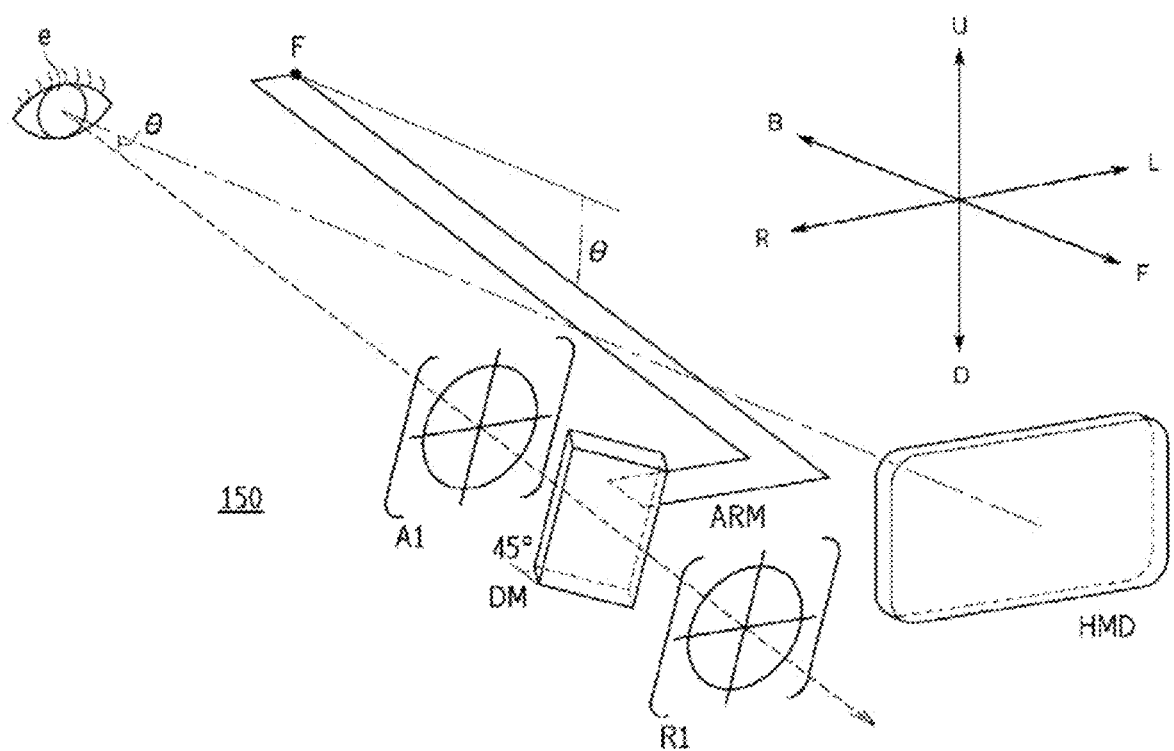
FIG. 11 is a schematic perspective view illustrating a configuration of the image display device according to the sixth embodiment.

Next, a sixth embodiment of the present disclosure will be described with reference to FIGS. 10 and 11. The description of the same contents as those of the first embodiment and the fourth embodiment will be omitted. The present embodiment is different from the fourth embodiment in that the rotation supporting portion ARM is rotated around a viewpoint to change image forming positions of the first front image A1 and the first rear image R1, which are aerial images. FIG. 10 is an optical path diagram of an image display device 150 according to the present embodiment. FIG. 11 is a schematic perspective view illustrating a configuration of the image display device 150 according to the present embodiment. In FIGS. 10 and 11, illustration of the first image projection unit S1, the first beam splitter BS1, the second beam splitter BS2, the retroreflection unit RR, the reflection unit M, the shutter portions SH, and the case portion CS is omitted for the sake of simplicity.

As illustrated in FIG. 11, the rotation supporting portion ARM holds at least the dichroic mirror DM provided in the image forming optical unit, and is rotatable in the up-down direction within an angle range of θ around a fulcrum point F as the rotation center. Here, θ is an angle at which the dichroic mirror DM is rotated up and down by the rotation of the rotation supporting portion ARM, where θ is 0 degree when the dichroic mirror DM is horizontal from a viewpoint e. Although FIGS. 10 and 11 illustrate an example in which the rotation supporting portion ARM is rotated downward from a front center direction by the angle θ, the rotation supporting portion ARM may be rotated upward.

When the rotation supporting portion ARM rotates around the fulcrum point F, the first beam splitter BS1, the second beam splitter BS2, the retroreflection unit RR, the reflection unit M, and the dichroic mirror DM illustrated in FIG. 1 rotate by the angle θ while maintaining a relative positional relationship therebetween. Therefore, image forming positions in the air of the first front image A1 and the first rear image R1 formed by the light emitted from the first image projection unit S1 are also changed by the angle θ similarly to the rotation of the rotation supporting portion ARM. Accordingly, the user visually recognizes the aerial images of the first front image A1 and the first rear image R1 in the direction displaced by the angle θ from the front center direction.

Here, a range of the angle θ is preferably a range of 25 degrees ($-25° \leq θ \leq 25°$) in the up-down direction with respect to the front center direction from the viewpoint e of the user. When the angle θ is larger than 25 degrees or less than −25 degrees, an amount of movement of the line of sight for visually recognizing the aerial images of the first front image A1 and the first rear image R1 becomes large, and it becomes difficult to maintain comfort in the superimposed display with the background.

It is preferable that a distance from the fulcrum point F of the rotation supporting portion ARM to the dichroic mirror DM and a distance from the viewpoint e to the dichroic mirror DM are approximately the same. That is, the fulcrum point F and the viewpoint e are preferably at the same position in the depth direction. Accordingly, a path of the light reflected by the dichroic mirror DM and traveling in a direction of the viewpoint e is displaced at the same angle θ as the rotation angle of the rotation supporting portion ARM. Therefore, the rotation of the rotation supporting portion ARM and the displacement of the image forming positions of the first front image A1 and the first rear image R1 are interlocked with each other, and the image forming positions of the first front image A1 and the first rear image R1 can be changed by an intuitive operation.

If the dichroic mirror DM moves in parallel to the vertical direction or the lateral direction, the distance or the relative angle of the dichroic mirror DM as viewed from the viewpoint e changes. In this case, the path of the light reflected by the dichroic mirror DM is different from that illustrated in FIG. 1, and display contents of the first front image A1 and the first rear image R1 are changed from those before the change.

In contrast, in the image display device 150 of the present application, the movement of the dichroic mirror DM is not parallel movement in the vertical direction, but rotational movement around the fulcrum point F. Accordingly, the relative positional relationship and an angle relationship of the image forming optical unit for forming the first front image A1 and the first rear image R1 can be maintained as illustrated in FIG. 1, and the image forming positions of the first front image A1 and the first rear image R1 can be maintained at the distances from the viewpoint e, and the display content of the aerial image can be maintained regardless of the rotation of the rotation supporting portion ARM.

As described above, in the image display device 150 of the present embodiment, the dichroic mirror DM held by the rotation supporting portion ARM rotates around the fulcrum point F. Accordingly, the positions of the first front image A1 and the first rear image R1 to be formed in the space can be changed, and a degree of freedom of a display position can be improved.

Further, when the rotation supporting portion ARM is used by being rotated upward, a wavelength filter is combined with the dichroic mirror DM to cut unnecessary external light. The wavelength filter is an optical member that cuts ultraviolet light and/or infrared light, and a known film structure may be used. The dichroic mirror DM and the wavelength filter may be formed separately, or both may be combined and integrally formed. Further, the dichroic mirror DM may be configured to reflect ultraviolet light and/or infrared light, and the dichroic mirror DM may also function as a wavelength filter.

Accordingly, even if ultraviolet light or infrared light travels from the outside in the direction of the viewpoint e, the ultraviolet light and the infrared light are cut or reflected by the wavelength filter, so that the ultraviolet light and the infrared light do not reach the viewpoint e. Accordingly, even when the rotation supporting portion ARM is rotated upward, it is possible to prevent ultraviolet light or infrared light from the outside from being directly incident on the viewpoint e of the user, and to protect the eyes of the user.

The present disclosure is not limited to the embodiments described above, various modifications can be made within the scope of the claims, and embodiments obtained by appropriately combining technical methods disclosed in different embodiments are also included in the technical scope of the present disclosure.

The invention claimed is:

1. An image display device comprising:
a first image projector configured to project a first image;
a beam splitter configured to reflect a part of light emitted from the first image projector in a first direction and transmit remaining light in a second direction;
a retroreflector configured to retroreflect, to the beam splitter, light traveling from the beam splitter in one of the first direction and the second direction;
a reflector configured to reflect, to the beam splitter, light traveling from the beam splitter in the other of the first direction and the second direction;
an image forming optical unit comprising a dichroic mirror configured to form an image of the light reflected by the retroreflector and the reflector in a space; and
a second image projector configured to project a second image,
wherein the beam splitter is configured to reflect a part of light emitted from the second image projector in the first direction and transmit remaining light in the second direction,
wherein the light emitted by the first image projector has a first wavelength,
wherein the light emitted by the second image projector has a second wavelength different from the first wavelength, and
wherein the image display device further comprises:
a first filter disposed at one of a position between the beam splitter and the retroreflector and a position between the beam splitter and the reflector, configured to cut the first wavelength, and configured to transmit the second wavelength; and
a second filter disposed at the other of the position between the beam splitter and the retroreflector and the position between the beam splitter and the reflector, configured to cut the second wavelength, and configured to transmit the first wavelength.

2. The image display device according to claim 1, wherein the dichroic mirror is configured to selectively reflect a wavelength of the light emitted by the first image projector.

3. The image display device according to claim 1 further comprising:
a shutter disposed between the beam splitter and the retroreflector and/or between the beam splitter and the reflector, and configured to switch between passing and blocking of light.

4. The image display device according to claim 1, wherein an image forming position of the first image and an image forming position of the second image are different from each other.

5. The image display device according to claim 1 further comprising:
a rotation support configured to rotatably hold the image forming optical unit with a fulcrum point as a rotation center.

6. An image display device comprising:
a first image projector configured to project a first image;
a beam splitter configured to reflect a part of light emitted from the first image projector in a first direction and transmit remaining light in a second direction;
a retroreflector configured to retroreflect, to the beam splitter, light traveling from the beam splitter in one of the first direction and the second direction;
a reflector configured to reflect, to the beam splitter, light traveling from the beam splitter in the other of the first direction and the second direction;
an image forming optical unit comprising a dichroic mirror configured to form an image of the light reflected by the retroreflector and the reflector in a space; and
a second image projector configured to project a second image,
wherein the beam splitter is configured to reflect a part of light emitted from the second image projector in the first direction and transmit remaining light in the second direction,
wherein the light emitted by the first image projector has a first wavelength,
wherein the light emitted by the second image projector has a second wavelength different from the first wavelength, and
wherein the image display device further comprises:
a first filter disposed at one of a position between the beam splitter and the retroreflector and a position between the beam splitter and the reflector, configured to cut the first wavelength, and configured to transmit the second wavelength; and a second filter disposed at the other of the position between the beam splitter and the retroreflector and the position between the beam splitter and the reflector, configured to cut the second wavelength, and configured to transmit the first wavelength, and a transmissive display configured to display a third image, wherein the first image and the third image are displayed in the same field of view range.

* * * * *